3,060,753
EXTERNALLY ACTUATED INTERNAL ADJUSTMENT MEANS FOR HERMETICALLY SEALED INSTRUMENTS
Harry Conviser, 1335 Woodruff Ave., Los Angeles 24, Calif.
Filed Feb. 27, 1961, Ser. No. 92,087
6 Claims. (Cl. 74—18.1)

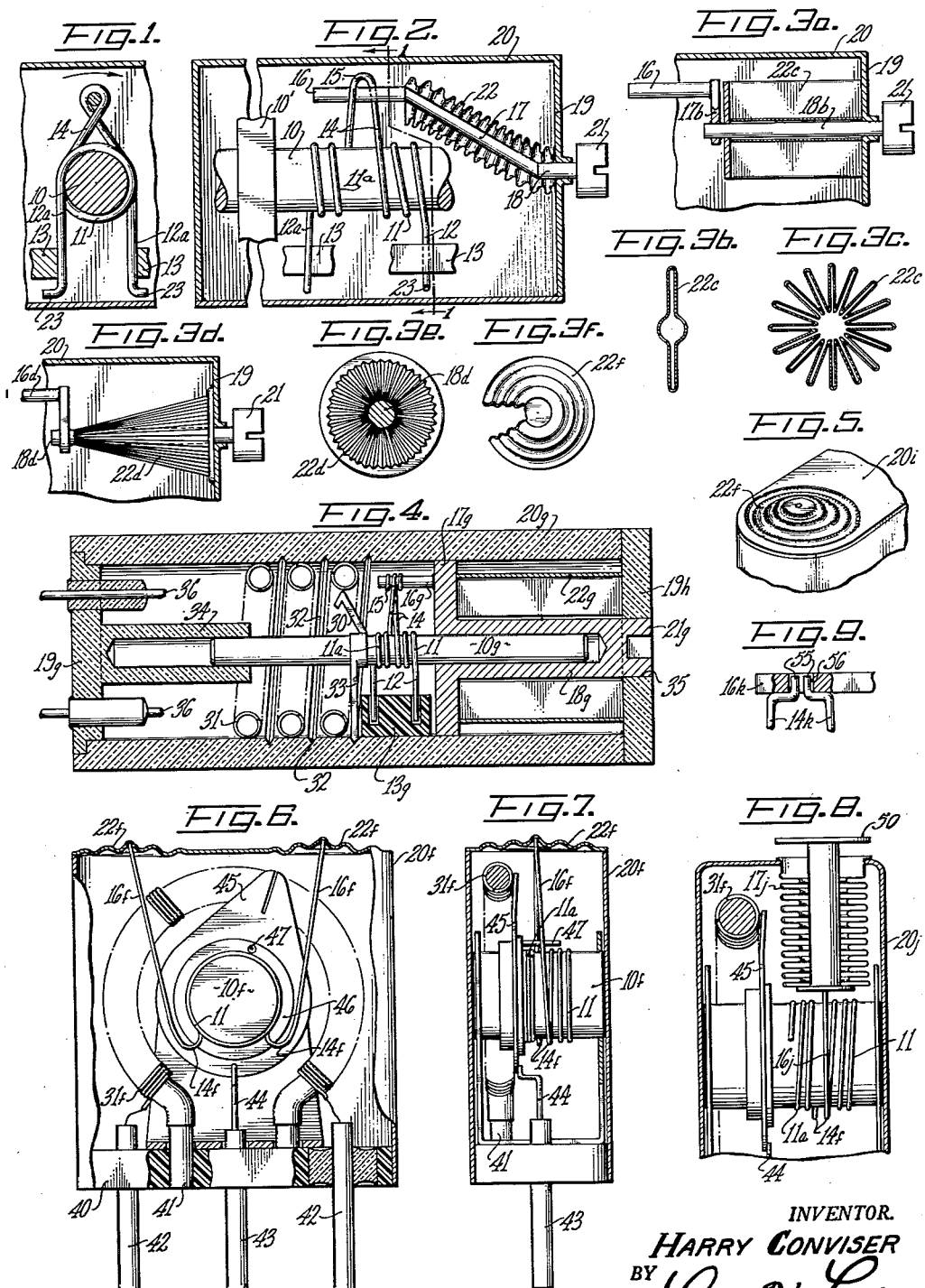

The present invention relates to an hermetically sealed controller, and more particularly to a mechanism for adjusting a control member contained within a sealed enclosure by means of a coupling device accessible from outside said enclosure.

There exists a wide variety of electrical and/or mechanical devices requiring sealed encasement whose external adjusting means, adjustments or provisions cause leakage to occur between outer and inner environments, affecting normal or continuous functioning. The effects of moisture, corrosive gases or liquids as well as dust particles, for example, have been known to impair intended operation. In addition, in a large number of sealed control devices, the mechanism are preset, and once sealed cannot be re-adjusted when inevitable drift from initial settings require internal changes to be made. This makes for considerable waste, since re-working of such devices generally is not practicable.

Many attempts have been made to provide a controller that would serve to move or adjust a mechanism through a seal, but these for the most part have been bulky and expensive and generally have required high torque, thus restricting their application to a limited number of uses. By contrast, the present invention may be made small enough to fit into a wrist watch, is simple and inexpensive to manufacture and requires low torque in operation.

The principal object of this invention, therefore, is to provide adjusting means operable through a sealed surface to an enclosed movable member.

Another object of the invention is to provide a bi-directional driving mechanism for rotating a shaft contained within a sealed enclosure.

A further object of the invention is to provide a balanced drive mechanism that will maintain an adjusted position over a wide range of operating temperatures and pressures.

Other objects and advantages of the invention will appear in the ensuing specifications and appended drawing, in which:

FIG. 1 is a sectional view of the basic drive mechanism taken on a line 1—1 of FIG. 2;

FIG. 2 is a side view, partially in section, showing a combination of members illustrating the principles of operation of the invention;

FIGS. 3a, 3b, 3c, 3d, 3e and 3f are fragmentary views of modified forms of the device utilizing the invention;

FIG. 4 is a cross-sectional view of an assembly of members illustrating a typical application of the invention;

FIG. 5 is a partial view of an enclosure having an external control member embodied in a part of the housing of the controller;

FIG. 6 is a fragmentary front view, partially in section, showing an embodiment in a typical device;

FIG. 7 is an axial sectional view of the controller of FIG. 6;

FIG. 8 is an axial sectional view of a controller embodying another alternate form of control member; and FIG. 9 is a fragmentary view of a modified form of drive connection between actuator crank and drive springs.

Referring now to the drawing in detail, and in particular to FIG. 1, I have shown therein schematically, by way of example, a controller utilizing an internal drive mechanism embodying one form of the invention.

In FIG. 1, which illustrates the basic principle of the internal drive mechanism, a rotatable shaft 10 is encircled by a snugly fitting driving coil spring 11 having at one end a tail 12 confined between restraining members 13 which resist arcuate swinging movement thereof, and having at its other end an actuator 14 adapted to be engaged by any suitable actuator member and moved circumferentially. Movement of arm 14 in the direction indicated by the arrow will cause the spring 11 to tighten around the shaft 10, to grip the same, and to rotate it in a clockwise direction as seen in FIG. 1, whereas movement of arm 14 in the opposite direction tends to loosen the grip of the spring on the shaft, imparting little or no motion to the shaft 10. Shaft 10 represents a portion, of circular cross-section, of a control element that is to be angularly adjusted.

It will be apparent that in order to transmit an increment of rotation to the control element shaft 10, the clutching spring 11 must bodily rotate after having become tightly coiled into clutching engagement with the shaft 10. To avoid restraint upon such rotation by the tail 12 or 12a, the restraining effect of restraining member 13 is such as to permit a limited amount of longitudinal movement of a tail 12 or 12a as a small portion of its length (at the point of tangency with the clutching spring 11) is drawn around the shaft 10 to follow the increment of rotation of the clutching coil 11, while angular movement of the tail 12 is restrained.

The invention further contemplates the limiting of such longitudinal movement of the tail 12 at a point where a satisfactory increment of rotational movement has been imparted to the shaft 10, and to this end, the tail 12 may have at its free end a hook or head 23 (FIG. 1) to engage a restraining member 13 so as to prevent further longitudinal movement of tail 12, thus limiting the degree of angular movement imparted in one increment of movement.

FIG. 2, wherein like parts bear like numbers, illustrate how the broad principle of FIG. 1 can be embodied in a sealed controller wherein shaft 10 passes through a frictional collar 10' to impose a load or drag upon the shaft 10. Here it is seen that the driving unit comprises two coils 11 and 11a, having respective actuator arms 14 which may be integrally joined by a bight 15 and engaged by a common actuator finger 16 arranged to swing in an arcuate path concentric about the axis of shaft 10, the finger 16 extending between the arms 14 so that movement in one direction will tighten the driving coil 11 into clutching engagement with the shaft 10 to rotate the latter in a corresponding direction, whereas movement of finger 16 in the opposite direction will loosen the coil 11 while tightening the coil 11a to grasp the shaft 10 and rotate it in the opposite direction. During the return of the spring assembly to a neutral position, the shaft 10 is restrained by collar 10' in a fixed position. Finger 16 may be the swinging end of a crank having a diagonal crank arm 17 extending from the actuator shaft 18 and journalled, coaxially with shaft 10, in a bearing in an end member 19 of a sealed housing 20. The outer end of shaft 18, exposed externally of the housing 20, may be provided with a slotted or equivalent actuator head 21 to which a screw driver or other wrenching tool may be applied (or, alternatively, simply a knob) for angularly adjusting the crank in a selected direction. The crank may be sealed to the end wall 19 by a bellows 22 surrounding the crank arm 17, sealed at one end to the end wall 19 and sealed at its other end to the actuator finger 16 by any suitable means such as by soldering or brazing.

Angular movement applied to the crank through head 21, swinging the actuator finger 16 arcuately around the shaft 10, is accompanied by a weaving movement of the bellows 22 in a conical path including a torsional twisting of the bellows, thus permitting the finger 16 to deflect the arms 14 so as to tighten one of the driving coils 11, 11a while correspondingly loosening the other. At a given point in the deflection in the selected direction beyond a neutral position, the coil that is being tightened will grasp the shaft 10 and, upon continuation of the deflection, will transmit an increment of rotation thereto. By returning the finger 16 to the neutral position (during which return movement neither spring will clutch the shaft) and then again advancing the finger 16 in the selected direction away from the neutral position, it is possible to transmit successive increments of rotation to the shaft 10 until it has been adjusted to a selected degree of angular adjustment. During the actuation in the selected direction, the tail of the one spring is held by the restraining member 13 while the tail of the other spring is free to move. Alternatively, each of the tails can be anchored against movement in either direction. One or both of the coils 11, 11a may be utilized to provide restoring force to assist the actuator finger 16 in returning to its neutral position. Frictional collar 10′ supplies non-directional loading to the shaft 10 during the return action. By internally threading the collar 10′ and the portion of shaft 10 which extends through it, the shaft may be caused to advance axially in response to rotation thereof.

FIG. 3a discloses an alternate driving means utilizing a torsionally flexible member 22c in the form of a partially flattened thin-wall tube, shown in cross section in FIG. 3b. Actuator head 21 here provides a straight-line control of a crank 17b secured to the inner end of actuator shaft 18b, and movement is transmitted from finger 16 to a shaft-driving spring arrangement similar to that shown in FIG. 2. Torsional member 22c, sealed at one end to the shaft 18b and at its other end to the housing end wall 19, yields with a twisting action to permit the rotation of shaft 18b while maintaining an hermetically sealed joint between the housing and the mechanism therewithin. Thus the desired transmission of motion through a seal is attained.

FIG. 3c shows another configuration of torsional seal 22c in the form of corrugated tubing wherein a circumferential array of radially corrugated fins extends axially in a manner similar to the flattened tube 22c of FIG. 3a.

FIG. 3d discloses another modification of torsionally yieldable seal, of conical form, indicated at 22d, sealed at one end to the housing end wall 19 and at its other end to the actuator shaft 18d, on the inner end of which is secured an actuator crank having an actuator finger 16d arranged to actuate a shaft-clutching spring assembly such as that shown in FIG. 2. An end view of the bellows seal 22d is shown in FIG. 3e. I have found such bellows seal 22d to permit pre-stressing in the process of sealing to form a flat rather than conical shape, effecting a saving in axial space. Thus FIG. 3e may be regarded either as an end view of FIG. 3d, or as representing a flat diaphragm type of torsionally flexible seal, with radial corrugations.

FIG. 3f discloses another modified form of seal, embodying an annularly convoluted diaphragm 22f, partially cut away to illustrate the cross sectional structure of its convolutions. Such a diaphragm can be used to effect a saving in space (as well as cost) and will permit lever motion to be applied to a spring-actuator finger 16 through a suitable connecting link.

Having now described some of the principles and structures underlying this invention, I shall proceed to a description of an electro-mechanical component as a typical but not limiting embodiment of my invention.

FIG. 4 shows a side view, partly in section, of an hermetically sealed potentiometer in which 10g is the control element drive shaft, and the arrangement of a pair of clutching coils 11, 11a with their actuator arms 14, joined by an integral bight 15, is substantially the same as in FIG. 2 as indicated by the use of like reference numerals. Anchoring tails 12 are yieldingly restrained in respective sockets in an anchoring block 13g secured to the inner wall of a cylindrical barrel 20g constituting the lateral wall of the sealed housing. The control element shaft 10g carries a wiper arm 30 adapted to make electrical contact with a control element in the form of a helically coiled potentiometer resistance element 31 mounted on the inner wall of barrel 20g in encircling relation to an end portion of shaft 10g at one side of the driving coil assembly. The two ends of the barrel 20g are closed by respective headers 19g and 19h respectively. Movement of wiper arm 30 in a helical path may be provided for by a suitable helical thread groove 32 in the housing barrel 20g and a follower element 33 secured to shaft 10g, projecting radially therefrom and meshing in the groove 32 to effect a screw action as the shaft 10g is rotated.

Mounted to the center of header 19g and projecting inwardly along the major axis of the housing is a bearing bushing 34 in which the one end of shaft 10g is rotatably but snugly fitted with a frictional engagement which holds the shaft 10g against rotation except when angular driving movement is being imparted thereto by one of the driving coils. The bearing bore within bushing 34 is of sufficient axial depth to accommodate the full range of axial travel of shaft 10g corresponding to the axial extent of potentiometer resistance element 31.

In the opposite end of the housing is a rotary actuator comprising an elongated hub 18g (corresponding broadly to the crank shaft 18) having a closed outer end providing an actuator head 21g, journalled in a cylindrical bearing opening 35 in the end cap 19h, and having at its inner end a radial flange 17g (corresponding broadly to the crank arm 17 of FIG. 2) in which is mounted an actuator finger 16g in the form of a crank pin extending parallel to shaft 10g in eccentric relation thereto. Crank pin 16g extends through the bight 15 of the driving coil unit to transmit angular deflection to actuator arms 14 in the manner described in connection with FIG. 2. The closed outer end 21g of the actuator hub may have a screwdriver slot similar to that of actuator head 21 of FIG. 2, or any conventional wrenching socket for the application of a wrenching tool to the head 21g.

Surrounding the hub 18g is a suitable torsionally flexible tubular seal 22g having its inner end sealed to the flange 17g and its outer end sealed to the end cap 19h around the bearing opening 35. The seal 22g cooperates with the rotary actuator 18g, 17g and the header 19h in sealing the adjacent ends of the housing, and at the same time, accommodates the limited angular adjustment of the rotary actuator required for transmitting incremental movement to the shaft 10g.

Wires 36 pass through hermetically sealed terminals of header 19g. External control is provided through slotted head 21g, the flange 17g moving actuator finger 16g, to which actuator arms 14 are coupled. Torsional seal 22g may be of the type shown in FIGS. 3a and 3b in FIG. 3c or in FIG 3d.

Exact constructional details of the potentiometer shown in FIG. 4 has been omitted in the interest of simplicity of explanation and will be apparent to those skilled in the art. Whether the shaft 10g should be conductive and related surfaces lined with or made of an insulating material or vice versa, are matters of choice rather than of invention, as are the ways in which wiper-arm 30 and potentiometer winding leads are carried to terminals of header 19g. It may be significant, however, to note that in a model built of the FIG. 4 configuration the control element shaft had a diameter of .028 inch and was driven by a clutch coil of .010 inch diameter Phosphor-bronze wire wound with two turns less than shown in FIG. 4, giving satisfactory operation through 60 degree torsional deflection of slotted-head member 21 for bi-directional rotation.

It will be apparent that, in lieu of joining the two drive coils 11, 11a by actuator arms 14 extending outwardly to an extent such that the actuator finger 16 may be extended between them (thus permitting the use of the simple expedient of joining them by the bight 15) it would be possible to utilize a connection between the springs inwardly of the actuator fingers and coupled thereto by a projection or projections on arms 14, extending outwardly through an aperture in the actuator finger, as broadly indicated in FIG. 9. More specifically, the driving coils may be separate from one another, and their respective actuator arms 14k as shown in FIG. 9, may be coupled individually to the actuator finger 16k (and thus coupled to one another) by means of tips 55 on arms 14k, loosely received in an aperture 56 in the actuator finger 16k.

FIG. 5 shows a perspective view of a portion of an hermetically sealed enclosure 20i for a potentiometer utilizing a diaphragm 22f shown in FIG. 3f for external control means, while FIGS. 6 and 7 show a typical internal structure of said potentiometer.

Referring now to FIGS. 6 and 7, where like numbers represent like parts shown in previous figures, flexible diaphragms 22f are formed in the wall of housing 20f in one side thereof, equally spaced on opposite sides of a plane of the control element shaft 10f normal to that side. Movement is transmitted from the diaphragms 22f to the respective clutch coils 11, 11a through push rods or stems 16f which are shown as being formed as integral extensions of relatively short actuator arms 14f formed as bights joining the push rods 16f to the one ends of the respective coils to which the tightening-winding movements are transmitted. The push rods 16f project generally tangentially to the paths of angular deflection of the outer extremities of the bights 14f in their arcuate movements. The outer ends of push rods 16f are engaged against the centers of diaphragms 22d and preferably are attached thereto as by welding or brazing. The diaphragms 22f are disposed approximately normal to the push rods 16f so that their axes of deflection may approximately coincide with the longitudinal axes of the push rods, thus providing for the transmission of movement through the push rods when the diaphragms are deflected under finger tip pressure. The bights 14f are adapted to bend so as to provide the equivalent of a pivotal action between the ends of push rods 16f and the one ends of driving coils 11, 11a as the angular relationship between the said push rods and the said one ends of the coils necessarily varies with arcuate movement of the one ends of the coils.

The push rods 16f (with respect to the circumferential direction) project in opposite directions from opposite sides of the pair of driving coils, and thus when one push rod is actuated, an increment of rotation in one direction will be transmitted whereas when the other push rod is actuated an increment of rotation in the opposite direction will be transmitted, thus making it possible, as in FIG. 2, to adjust the control element selectively in either direction, the actuating movements proceeding from a neutral position to a limit of the incremental movement in one direction or the other, in either case, and upon release of actuating pressure, the respective driving coil being relaxed and the push rod and coil both returning to a neutral or starting position. The diaphragms 22f, which may be of thin spring sheet metal, may be utilized to assist the spring action of the clutch coils themselves in returning to the neutral position after an increment of actuating movement has taken place.

Diaphragms 22f may be formed in walls of housing 20f or may be separately formed as diaphragm 22f of FIG. 3f brazed or soldered along its outer periphery to appropriate holes in top of housing 20f to provide seals and retain flexibility to permit the required operation. As shown in FIGS. 6 and 7, housing 20f is provided with a base 40 to which it is soldered at all mating surfaces to complete the seal. Base 40 is shown to support a mandrel 41 whose uninsulated ends are soldered in holes in base 40, whereas the remainder of mandrel 41 is insulated and carries potentiometer winding 31f of resistance wire. The ends of the potentiometer winding are soldered or welded to hermetically sealed terminals 42 contained in base 40. A third such terminal 43 carries a blade 44 in frictional contact with wiper arm 45, which is fastened to shaft 10f through insulator 46 so that no electrical contact is made to shaft 10f. Insulator 46 contains a protruding pin 47 which acts as mechanical stop for the wiper arm when it is advanced to either end of potentiometer winding 31f by nestling in the bights 14f of spring 11 and 11a. When pin 47 is advanced into the bight of spring in the forward movement it is carried back by the return movement of the spring, thus preventing overtravel of the wiper arm 45.

It should be pointed out that the support of mandrel 41 in base 40 has the advantage of conducting any heat generated by the potentiometer winding 31f to the base 40 and surrounding housing 20f, thus offering a larger heat dissipating surface for radiation, convection and conduction through the mounting surfaces. This is particularly beneficial if the potentiometer is sealed in vacuo, wherein heat conductivity is extremely poor.

FIG. 8 shows a partial view, in cross-section, of a bellows 17j, the open end of which is sealed to a surface of housing 20j in an opening provided therefor. A plunger 50 extends into bellows 17j and is sealed to its inner end, to which a tail 16j on the one end of clutch coils 11, 11a, are fastened. Coil 11a is connected to a similar bellows and plunger (not shown) to provide rotational motion in the reverse direction. Tails 16j are connected to their respective clutch coils 11, 11a by bights 14f, as in FIG. 6. The operation of the controller of FIG. 8 is essentially the same as that of FIGS. 6 and 7.

While this description of the invention is related to hermetically sealed potentiometers, this by no means is intended to limit the scope of its application. It should be apparent to anyone skilled in the art that the hermetically sealed controller may be applied to a large number of mechanical and electro-mechanical devices wherein the several types of motion shown may be advantageously utilized. For example, the controller may be used to wind and/or set the hands of an appropriately designed watch, or the relative opening and closing positions of a sealed thermoswitch or electromechanical relay, or a reference position in a sealed electrical indicating meter, etc. Hermetically sealed trimmer capacitors and/or inductors can be made inexpensively and in miniature sizes by utilizing the sealed drive mechanism of this invention.

I claim:

1. In an hermetically sealed controller, in combination: a sealed housing; a control shaft having a portion of circular cross section providing a rotary control action upon adjustment thereof; actuator means comprising an actuator part within said housing and an actuator member extending through a wall of said housing in sealed relation thereto and connected to said actuator part for transmitting arcuate movement thereto, said actuator member having externally operable means for transmitting arcuate movement thereto; a driving element coiled around said circular cross sectional portion of said control shaft in closely encircling relation thereto, having an actuator arm intermediate of the coils of said driving element engaged by said actuator part for coiling said driving element into clutching engagement with said control shaft when moved in one direction by said actuator part, whereby to clutch said control element and transmit an increment of arcuate adjusting movement thereto, and to relax its clutching engagement with said control shaft so as to release the same upon being returned to a neutral position; and means restraining the ends of said driving element from movement in the said coiling direction of movement of said actuator arm, whereby to cooperate therewith in effecting said clutching engagement.

2. A controller as defined in claim 1, wherein said actuator means comprises a crank including a crank arm within said housing, connecting said actuator part to said actuator shaft, and including a seal surrounding said shaft within said housing, said actuator shaft having an extended length within said housing, said seal comprising a thin-wall torsionally flexible tubular structure having an axially extending hub area in which said extended portion of the actuator shaft is enclosed, and including axially elongated flattened vane-like portions extending radially from said hub area in symmetrical relation thereto, said tubular structure being sealed at its outer end to an inner wall of said housing and having an end closure sealing its inner end, said actuator means further including a crank arm secured to the inner end of said crank shaft and to said inner end closure, said crank arm projecting radially from said crank shaft and carrying said actuator part, said tubular structure having a flexibility such as to undergo torsional angular deflection of its inner end with respect to its end sealed to the housing in response to angular movement of said crank.

3. A controller as defined in claim 1, wherein said coiled driving element is divided into a pair of driving coils both of which encircle said control shaft in axially separated but adjacent relation said actuator arm being integral with and extending tangentially from one end of each of said driving coils in a common generally radial direction and having the bight integrally joining said one ends to form said actuator arm, said actuator part extending through said bight in a direction parallel to the axis of said control shaft and engaging said actuator arm for transmitting angular deflections thereto, and further including anchoring tails formed integrally with and projecting tangentially from the other end of each of said driving coils and engaged with said restraining means in a manner to yieldingly resist angular movements of said other ends of said coils in the respective winding direction, in a manner such as to effect said clutching engagement and then to permit limited increments of rotation of the respective coils for transmitting the increments of angular adjustment to said control shaft.

4. In an hermetically sealed controller, in combination: a sealed housing; a rotary control element having a portion of circular cross section providing movement in a helical path upon angular adjustment thereof; a driving coil snugly encircling said portion of circular cross section of the control element, adapted, in response to angular movement of one end thereof in a direction to effect winding of said coil more tightly around said control element resulting in clutching engagement therewith, and then to transmit an increment of angular movement to said control element; means restraining the other end of said coil against angular movement in the direction of said winding action, whereby to cooperate with the winding movement of said one end to effect said clutching engagement; actuator means sealed within said housing and connected to said one end of said coil, for transmitting thereto said angular movements in the winding direction; and means connected to an outer end portion of said movement-transmitting means and engageable externally of said housing for transmitting arcuate actuator movements thereto.

5. In an hermetically sealed controller, in combination: a sealed housing including a cylindrical tubular barrel and respective headers closing the respective ends thereof; a bearing mounted on and projecting inwardly from one of said headers along the axis of said barrel; a rotary actuator including a hub of substantial axial length having a closed outer end functioning as an actuator head, journalled in a central opening in the other header, having an integral radial flange on its inner end and having a bearing bore extending through said flange to said closed outer end; a torsionally-flexible tubular seal surrounding said hub, having an inner end sealed to said flange and an outer end sealed to said other header around said central opening, whereby said rotary actuator, tubular seal and other header cooperatively seal the adjacent end of the housing; an actuator shaft having one end journalled in said bearing on the one header and its other end journalled in said bearing bore of the rotary actuator; and incremental angular movement transmitting means comprising a pair of axially separated helical driving coils encircling said shaft, a pair of actuator arms formed as integral tangential extensions of adjacent ends of said coils, projecting from said shaft, and an eccentrically positioned actuator finger carried by said flange and projecting therefrom generally parallel to said shaft into engagement with both of said actuator arms for transmitting angular movement thereto in directions to alternatively effect tightening-winding of said coils into clutching engagement with said shaft for transmitting increments of rotational movement thereto for adjusting a control device sealed within said housing, movement of said actuator finger in one angular direction being effective to deflect one of said arms to effect said tightening-winding of its respective coil while relaxing the other coil and movement of said actuator finger in the opposite direction being effective through the actuator arm of said other coil to effect said tightening-winding of said other coil while relaxing said one coil, respective anchoring tails integral with and projecting tangentially from the other ends of the respective clutching coils, and means anchoring said tails against angular deflection in their respective tightening-winding directions so as to cooperate with the angular deflection of the respective actuator arms in effecting said tightening winding actions.

6. In an hermetically sealed controller, in combination: a sealed housing; a rotary control element having a portion of circular cross section providing a control action upon angular adjustment thereof; actuator means comprising an actuator part within said housing movable in an arcuate path centered at the axis of said control element and an actuator shaft extending through a wall of said housing in sealed relation thereto and coaxial with said control element, said actuator shaft having externally exposed means for transmitting angular movement thereto; a driving element coiled around said circular cross sectional portion of said control element in closely encircling relation thereto, having at one end an actuator arm engaged by said actuator part for coiling said driving element into clutching engagement with said control element when moved angularly in one direction by said actuator part, whereby to clutch said control element and transmit an increment of rotational movement thereto, and to relax its clutching engagement with the control element so as to release the same upon being returned to a neutral position; and means restraining the other end of said clutching element from angular movement in the said coiling direction of movement of said actuator arm, whereby to cooperate therewith in effecting said clutch engagement.

References Cited in the file of this patent

UNITED STATES PATENTS

| | | |
|---|---|---|
| 2,559,602 | Denman | July 10, 1951 |
| 2,595,213 | Raynor | Apr. 29, 1952 |
| 2,607,233 | Bosch | Aug. 19, 1952 |
| 2,685,208 | Lundquist | Aug. 3, 1954 |
| 2,897,681 | Cross et al. | Aug. 4, 1959 |